United States Patent
Johnson et al.

(10) Patent No.: US 12,148,446 B1
(45) Date of Patent: Nov. 19, 2024

(54) POWER IMPROVEMENT FOR MINIMUM SWITCHING FREQUENCY OPERATION

(71) Applicant: Western Digital Technologies, Inc., San Jose, CA (US)

(72) Inventors: Brian Johnson, Laguna Hills, CA (US); Nathaniel Dupler, Santa Ana, CA (US); Ryan Mayo, Aliso Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/471,405

(22) Filed: Sep. 21, 2023

(51) Int. Cl.
- *G11B 15/675* (2006.01)
- *G11B 15/44* (2006.01)
- *H02M 1/00* (2006.01)
- *H02M 3/158* (2006.01)

(52) U.S. Cl.
CPC ...... *G11B 15/67505* (2013.01); *G11B 15/442* (2013.01); *H02M 1/0025* (2021.05); *H02M 3/158* (2013.01)

(58) Field of Classification Search
None
See application file for complete search history.

(56) References Cited

U.S. PATENT DOCUMENTS

| | | | |
|---|---|---|---|
| 7,443,627 B1 | 10/2008 | Krishnamoorthy et al. | |
| 7,457,068 B2* | 11/2008 | Wasa | G11B 19/00 360/75 |
| 8,937,404 B1* | 1/2015 | Ferris | H02M 3/1584 307/29 |
| 8,994,346 B2 | 3/2015 | Rahardjo | |
| 11,763,843 B1 | 9/2023 | Byoun et al. | |
| 2001/0036031 A1* | 11/2001 | Hirano | G11B 5/54 |
| 2004/0143771 A1* | 7/2004 | Minabe | H04N 5/782 386/E5.043 |
| 2007/0188958 A1 | 8/2007 | Sase et al. | |
| 2008/0291711 A1* | 11/2008 | Williams | H02M 3/158 363/131 |
| 2010/0283422 A1 | 11/2010 | Tan et al. | |

(Continued)

FOREIGN PATENT DOCUMENTS

KR 101340715 B1 12/2013

OTHER PUBLICATIONS

STMicroelectronics, "AN2093 Application Note: ST1S03 Buck Converters for HDD Power Supplies", 2004, pp. 6.

*Primary Examiner* — Peter Vincent Agustin
(74) *Attorney, Agent, or Firm* — Neugeboren O'Dowd PC

(57) ABSTRACT

A data storage device or disk drive may include a plurality of regulators, a first voltage rail associated with a first regulator of the plurality of regulators, a second voltage rail associated with a second regulator of the plurality of regulators, wherein a switching frequency of the second regulator is greater than a switching frequency of the first regulator, the first voltage rail is associated with a higher voltage than the second voltage rail, or a combination thereof. The data storage device may include one or more processing devices configured to: determine a minimum switching frequency, identify a start time of a switching cycle for the first regulator, based at least in part on determining the minimum switching frequency; and, at or near the start time of the new switching cycle, couple the first regulator to the second regulator to initiate the switching cycle.

20 Claims, 7 Drawing Sheets

(56) References Cited

U.S. PATENT DOCUMENTS

| | | |
|---|---|---|
| 2013/0193937 A1 | 8/2013 | Horie |
| 2014/0327421 A1 | 11/2014 | Arao |
| 2016/0064986 A1* | 3/2016 | Langlinais ............ H02J 7/0068 320/134 |
| 2018/0034374 A1* | 2/2018 | Breen ................... G06F 9/4403 |
| 2019/0312513 A1* | 10/2019 | Jain ....................... H01F 27/402 |
| 2020/0112267 A1 | 4/2020 | Sakurai |
| 2021/0096585 A1* | 4/2021 | Kesarwani ......... G11B 5/59627 |
| 2023/0387799 A1* | 11/2023 | Wang .................. H02M 1/0067 |

* cited by examiner

POWER IMPROVEMENT FOR MINIMUM SWITCHING FREQUENCY OPERATION

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge $6_i$ (where 'i' ranges from 1 to N) comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during read/write operations. A position error signal (PES) is generated by reading the servo bursts 14, where the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

A rotational vibrational (RV) sensor is a common sensor used in a hard disk drive's (HDD's) servo mechanical control system. The output of the RV sensor can be impacted by regulators in the control circuitry of the HDD. In some cases, regulator to RV sensor noise coupling can occur when the load coupled to the regulator is "light" (i.e., current pulled/drawn by the regulator is under a threshold, load impedance is under a threshold, operating power of the regulator is low/under a threshold, to name a few non-limiting examples) and/or the switching frequency is low (e.g., <200 kHz, <500 kHz). Additionally, or alternatively, the mechanism of the coupling in the output capacitors of the switching regulator can vibrate, which can be picked up by the RV sensors, in particular in the low frequencies. In either case, a minimum switching frequency may be employed such that the switching frequency of the regulator is equal to or greater than the resonance frequency of the RV sensor. In some instances, however, the output of the switching regulator may be shorted to ground to achieve a threshold minimum switching frequency, which can lead to power losses that adversely impact disk drive performance.

In some circumstances, the minimum switching frequency feature employed on some disk drives works by turning ON the low side field effect transistor (FET) of the regulator, which helps short the switch node (i.e., of the FET) to ground in order to force the start of a new switching cycle. In some cases, this feature helps prevent the regulator from switching at a frequency that is at or near the $1^{st}$ or $2^{nd}$ order resonances (e.g., 30 KHz, 168 kHz) of the RV sensor (s) of the disk drive. In spite of enhancing the RV noise performance, this minimum switching frequency feature is rarely used due to the increased power consumption associated with the same.

Broadly, aspects of the present disclosure are directed to a technique for enhancing RV noise performance, while reducing or minimizing the increase in power consumption, as compared to the prior art. In some embodiments, instead of shorting the switch node to ground (which leads to all that power being lost), the output of the regulator can be momentarily shorted to another lower-voltage rail, which helps conserve the power that would be lost/expended otherwise, described in further detail below.

In some aspects, the techniques described herein relate to a disk drive including: a plurality of regulators; a first voltage rail associated with a first regulator of the plurality of regulators; a second voltage rail associated with a second regulator of the plurality of regulators, wherein a switching frequency of the second regulator is greater than a switching frequency of the first regulator, the first voltage rail is associated with a higher voltage than the second voltage rail, or a combination thereof; and one or more processing devices configured to: determine a minimum switching frequency; determine a start time of a switching cycle for the first regulator, based at least in part on determining the minimum switching frequency; and at or near the start time of the new switching cycle, couple the first regulator to the second regulator to initiate the switching cycle.

In some aspects, the techniques described herein relate to a disk drive, wherein the first regulator is coupled to a load that has a lower impedance than a load coupled to the second regulator.

In some aspects, the techniques described herein relate to a disk drive, wherein the first regulator is configured to draw a lower current than a current drawn by the second regulator.

In some aspects, the techniques described herein relate to a disk drive, wherein the one or more processing devices are further configured to: initiate the switching cycle, based at least in part on coupling an output of the first regulator on the first voltage rail to an output of the second regulator on the second voltage rail.

In some aspects, the techniques described herein relate to a disk drive, wherein each of the first regulator and the second regulator is one of a positive switching regulator (PSR), a positive boost switching regulator (pBSR), a negative boost switching regulator (nBSR), and a positive linear regulator (PLR).

In some aspects, the techniques described herein relate to a disk drive, further including a timer circuit, and wherein the one or more processing devices are further configured to: control the timer circuit to set a pre-determined shorting-time between the first voltage rail and the second voltage rail to control an overshoot generated on the second voltage rail when the first regulator is shorted or coupled to the second regulator.

In some aspects, the techniques described herein relate to a disk drive, further including: a power large scale integrated circuit (PLSI); a switch, such as a field effect transistor (FET), external to the PLSI; and a pin for controlling the switch (e.g., FET) to enable coupling an output of the first regulator from the first voltage rail to the second voltage rail to initiate the switching cycle, and wherein the switch or FET is coupled between the first voltage rail and the second voltage rail.

In some aspects, the techniques described herein relate to a disk drive, wherein the first regulator includes a first switch node and the second regulator includes a second switch node, and wherein the one or more processing devices are further configured to: couple the first switch node and the second switch node when a respective high side switch or FET of each of the first regulator and the second regulator is turned OFF to initiate the switching cycle.

In some aspects, the techniques described herein relate to a disk drive, wherein the first regulator includes a positive boost switching regulator (pBSR) and the second regulator includes a positive linear regulator (PLR), and wherein the one or more processing devices are further configured to: initiate the switching cycle, based at least in part on shorting an output pin of the pBSR with an output pin of the PLR.

In some aspects, the techniques described herein relate to a disk drive, wherein the first regulator includes a negative boost switching regulator (nBSR) and the second regulator includes a negative switching regulator (NSR), and wherein the one or more processing devices are further configured to: short an output pin of the nBSR with an output pin of the NSR to initiate the switching cycle.

In some aspects, the techniques described herein relate to a disk drive, wherein determining the minimum switching frequency is based at least in part on determining one or more higher order resonances of a rotational vibrational (RV) sensor of the disk drive.

In some aspects, the techniques described herein relate to a disk drive further comprising a PLSI, the PLSI comprising the first and second voltage rails. In some aspects, the techniques described herein relate to a disk drive, wherein (1) the switching frequency of the second regulator is greater than the switching frequency of the first regulator, and (2) the first voltage rail is associated with a higher voltage than the second voltage rail.

In some aspects, the techniques described herein relate to a method for operating a data storage device or disk drive, the method including: determining a minimum switching frequency; identifying, based at least in part on determining the minimum switching frequency, a start time of a switching cycle for a first regulator of the data storage device, wherein the first regulator is associated with a first voltage rail; and at or near the start time of the switching cycle, coupling the first regulator to a second regulator of the data storage device to initiate the switching cycle, wherein the second regulator is associated with a second voltage rail, and wherein at least one of a switching frequency of the second regulator is greater than a switching frequency of the first regulator and the first voltage rail is associated with a higher voltage than the second voltage rail.

In some aspects, the techniques described herein relate to a method, wherein initiating the switching cycle comprises coupling an output of the first regulator on the first voltage rail to an output of the second regulator on the second voltage rail.

In some aspects, the techniques described herein relate to a method, wherein the method further includes setting a pre-determined shorting-time between the first voltage rail and the second voltage rail to control an overshoot generated on the second voltage rail when the first regulator is shorted or coupled to the second regulator.

In some aspects, the techniques described herein relate to a method, further including: controlling, via a pin, a switch or field effect transistor (FET) to enable coupling an output of the first regulator from the first voltage rail to the second voltage rail to initiate the switching cycle, and wherein the switch or FET is external to a power large scale integrated circuit (PLSI) of the data storage device and is coupled between the first voltage rail and the second voltage rail.

In some aspects, the techniques described herein relate to a method, wherein the first regulator includes a first switch node, and the second regulator includes a second switch node, the method further including: initiate the switching cycle, based at least in part on coupling the first switch node and the second switch node when a respective high side field effect transistor (FET) of each of the first regulator and the second regulator is turned OFF.

In some aspects, the techniques described herein relate to a method, wherein the first regulator includes a positive boost switching regulator (pBSR) and the second regulator includes a positive linear regulator (PLR), the method further including: shorting an output pin of the pBSR with an output pin of the PLR to initiate the switching cycle.

In some aspects, the techniques described herein relate to a method, wherein the first regulator includes a negative boost switching regulator (nBSR) and the second regulator includes a negative switching regulator (NSR), the method further including: shorting an output pin of the nBSR with an output pin of the NSR to initiate the switching cycle.

In some aspects, the techniques described herein relate to a method, wherein at least one of: each of the first regulator and the second regulator is one of a positive switching regulator (PSR), a positive boost switching regulator (pBSR), a negative boost switching regulator (nBSR), and a positive linear regulator (PLR); and determining the minimum switching frequency is based at least in part on determining one or more higher order resonances of a rotational vibrational (RV) sensor of the data storage device.

In some aspects, the techniques described herein relate to a method, wherein (1) the switching frequency of the second regulator is greater than the switching frequency of the first regulator, and (2) the first voltage rail is associated with a higher voltage than the second voltage rail.

In some aspects, the techniques described herein relate to one or more processing devices, including: means for determining a minimum switching frequency; and means for identifying, based at least in part on determining the minimum switching frequency, a start time of a switching cycle for a first regulator of a data storage device, wherein the first regulator is associated with a first voltage rail; and means for coupling the first regulator to a second regulator of the data storage device to initiate the switching cycle at or near the start time, wherein the second regulator is associated with a second voltage rail, and wherein at least one of a switching frequency of the second regulator is greater than a switching frequency of the first regulator and the first voltage rail is associated with a higher voltage than the second voltage rail.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

DETAILED DESCRIPTION

Figure 1:
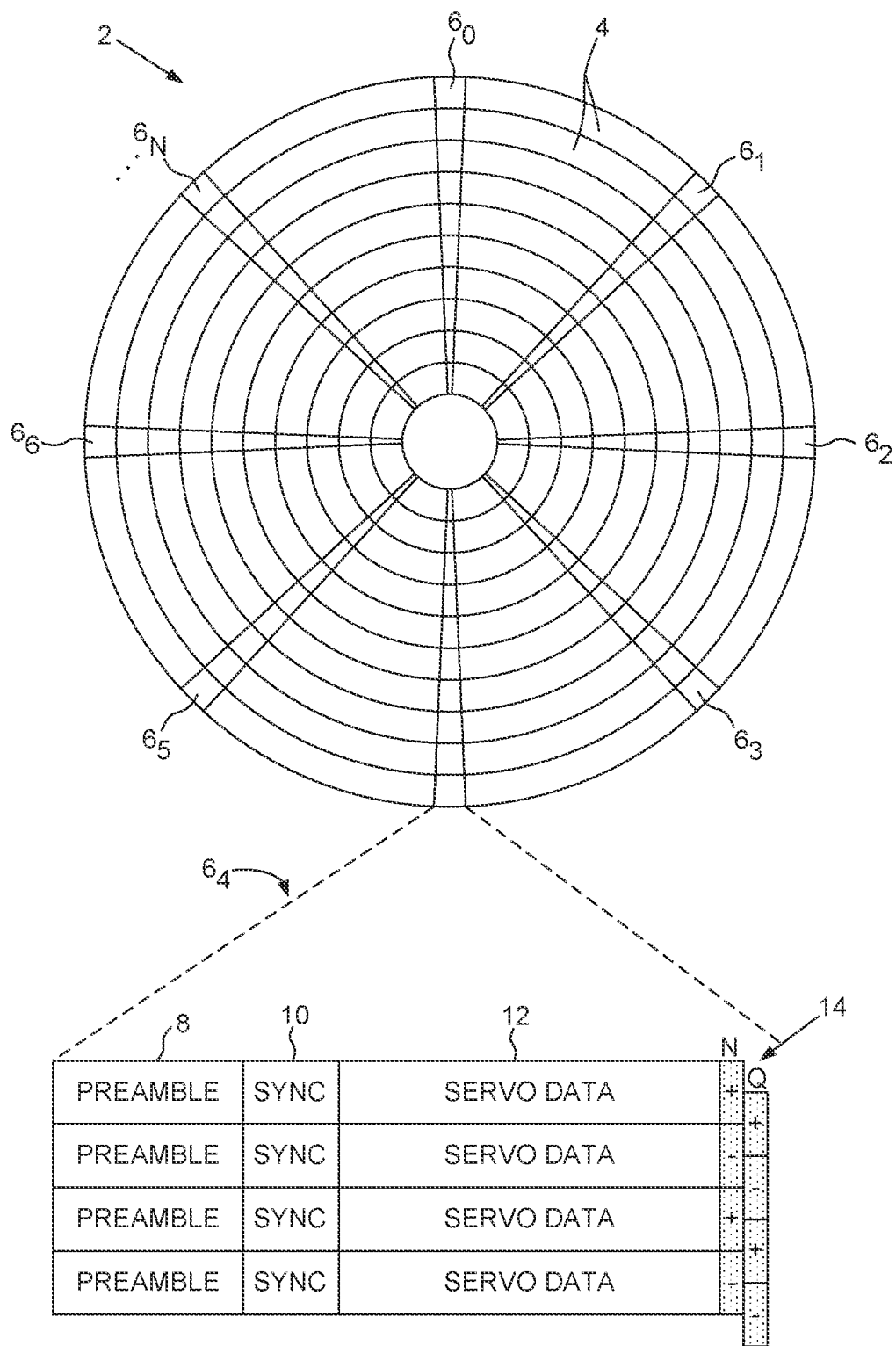
FIG. 1 shows a disk format as comprising a number of radially-spaced, concentric servo tracks defined by servo wedges recorded around the circumference of each servo track, according to various aspects of the present disclosure.

The word "exemplary" is used herein to mean "serving as an example, instance, or illustration." Any embodiment described herein as "exemplary" is not necessarily to be construed as preferred or advantageous over other embodiments.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

Magnetic recording hard disk drives use an actuator, typically a rotary voice-coil-motor (VCM) actuator, for positioning the read/write heads on the data tracks of the recording disks. The disk drive has a servo control system that receives a position error signal (PES) from servo positioning information read by the heads from the data tracks and generates a VCM control signal to maintain the heads on track and move them to the desired track for reading and writing of data. For instance, the head is connected to a distal end of an actuator arm assembly (or simply, actuator arm) which is rotated about a pivot by the VCM in order to actuate the head radially over the disk to access radially spaced, concentric tracks. The disk drive receives power from a host computer (e.g., host 25 in FIG. 2A), including a first power supply (e.g., 12V supply) for powering a spindle motor and the VCM 20, and a second power supply (e.g., 5V supply) for powering the integrated circuits that control the operation of the disk drive. In some examples, the amount of current that can be drawn by the disk drive from either supply may be limited so as not to interfere with the proper operation of the host computer 25.

Disk drives typically employ a plurality of regulators (e.g., voltage regulators) for regulating the voltage provided to the various components of the disk drive, including at least the System on Chip (SoC), serial flash memory, Dynamic Random Access Memory (DRAM), NAND flash memory, piezo actuator drivers, etc. Some non-limiting examples of the regulators that may be utilized in a disk drive include a positive switching regulator (PSR), a positive boost switching regulator (pBSR), a negative BSR (nBSR), a negative switching regulator (NSR), and a positive linear regulator (PLR). Some disk drives utilize multiple regulators of the same type but with different operating ranges. For example, a disk drive may utilize a first PSR having a first operating range (e.g., +2.5V PSR for the DRAM) and a second PSR having a second operating range (e.g., a +1V PSR for the main logic circuit in the SoC). Additionally, or alternatively, the disk drive may utilize a pBSR that is configured to regulate voltages up to a first threshold (e.g., +17V pBSR for the piezo actuator driver in the disk drive), an nBSR that is configured to regulate voltages down to a second threshold (e.g., −18V nBSR for the same or another piezo actuator driver), and/or a PLR that is configured to regulate voltages up to a third threshold (e.g., +1.8V PLR for the serial flash). Other types of regulators having different operating ranges (or regulator thresholds) and/or coupled to different subcomponents (e.g., DRAM, logic circuit in the SoC, piezo actuator drivers, serial flash, etc.) are contemplated in different embodiments, and the examples listed herein are not intended to limit the scope or spirit of the present disclosure.

In some circumstances, disk drives experience rotational vibration and disturbance forces during normal operation. These disturbances arise internally, such as from motion of the VCM actuator, as well as externally, such as from shocks to the frame supporting the disk drive or from the movement of other disk drives when the drives are mounted together in a disk array system. Some disk drives comprise a rotational vibrational (RV) sensor for detecting and correcting for the rotational vibration, which may serve to enhance the PES by canceling the off-track motion induced by the rotational vibration.

In some cases, a noise coupling between the regulator and RV sensor can occur when the load coupled to the regulator is "light" (i.e., current pulled/drawn by the regulator is under a threshold, regulator impedance is under a threshold, operating power of the regulator is low/under a threshold, to name a few non-limiting examples) and/or the switching frequency of the regulator's field effect transistor (FET) is low (e.g., <200 kHz, <500 kHz). In such cases, a minimum switching frequency feature may be employed, which can help ensure that the switching frequency of the regulator is equal to or greater than the resonance frequency of the RV sensor. In some instances, the noise coupling between the regulator and RV sensor can occur due to an electrical coupling (e.g., from output of switching regulator to RV sensor) and/or due to a mechanical coupling (e.g., output capacitors of the switching regulator can vibrate at low frequency and these vibrations can be picked up by the RV sensor).

Some prior art techniques for achieving a threshold minimum switching frequency entail shorting the output of the switching regulator to ground. For example, in some circumstances, the minimum switching frequency feature employed on some disk drives works by turning ON the low side field effect transistor (FET) of the regulator, which helps short the switch node (i.e., of the FET) to ground in order to force the start of a new switching cycle. In some cases, this feature helps prevent the regulator from switching at a frequency that is at or near the 1st or 2nd order resonances (e.g., 30 kHz, 168 kHz) of the RV sensor(s) of the disk drive. In spite of enhancing the RV noise performance, this minimum switching frequency feature is rarely used due to the increased power consumption and/or adverse impacts on disk drive performance.

Broadly, aspects of the present disclosure are directed to a technique for enhancing RV noise performance, while reducing or minimizing the increase in power consumption, as compared to the prior art. In some embodiments, instead of shorting the switch node to ground (which leads to all that power being lost), the output of the regulator can be momentarily shorted to another lower-voltage rail, which helps conserve the power that would be lost/expended otherwise. In some cases, a disk drive may employ a plurality of power rails (e.g., a high voltage rail, a low voltage rail) and a plurality of regulators (e.g., a higher voltage regulator, a lower voltage regulator). In accordance with aspects of the disclosure, the output of a low load, switching regulator (e.g., a higher voltage regulator, such as a +2.5V regulator) can be shorted to a low voltage-higher current-higher load regulator (e.g., +1V regulator) for a brief amount of time, which allows the higher voltage (e.g., +2.5V) to be drained. This in turn facilitates initialization of a new switching cycle and helps prevent the higher voltage regulator from switching at a frequency that is at or near the 1st or 2nd order resonances of the RV sensor(s). In some embodiments, a programmable short timer can be employed to help ensure that the higher and lower voltage regulators are shorted at the right time, which can help optimize voltage regulation, minimize or reduce the overshoot produced on the lower voltage rail, or a combination thereof. Besides optimizing power consumption, the minimum switching frequency feature(s) discussed herein can also help decrease the noise coupling between the regulator and the one or more RV sensor(s) of the disk drive, as compared to the prior art.

Figure 3:
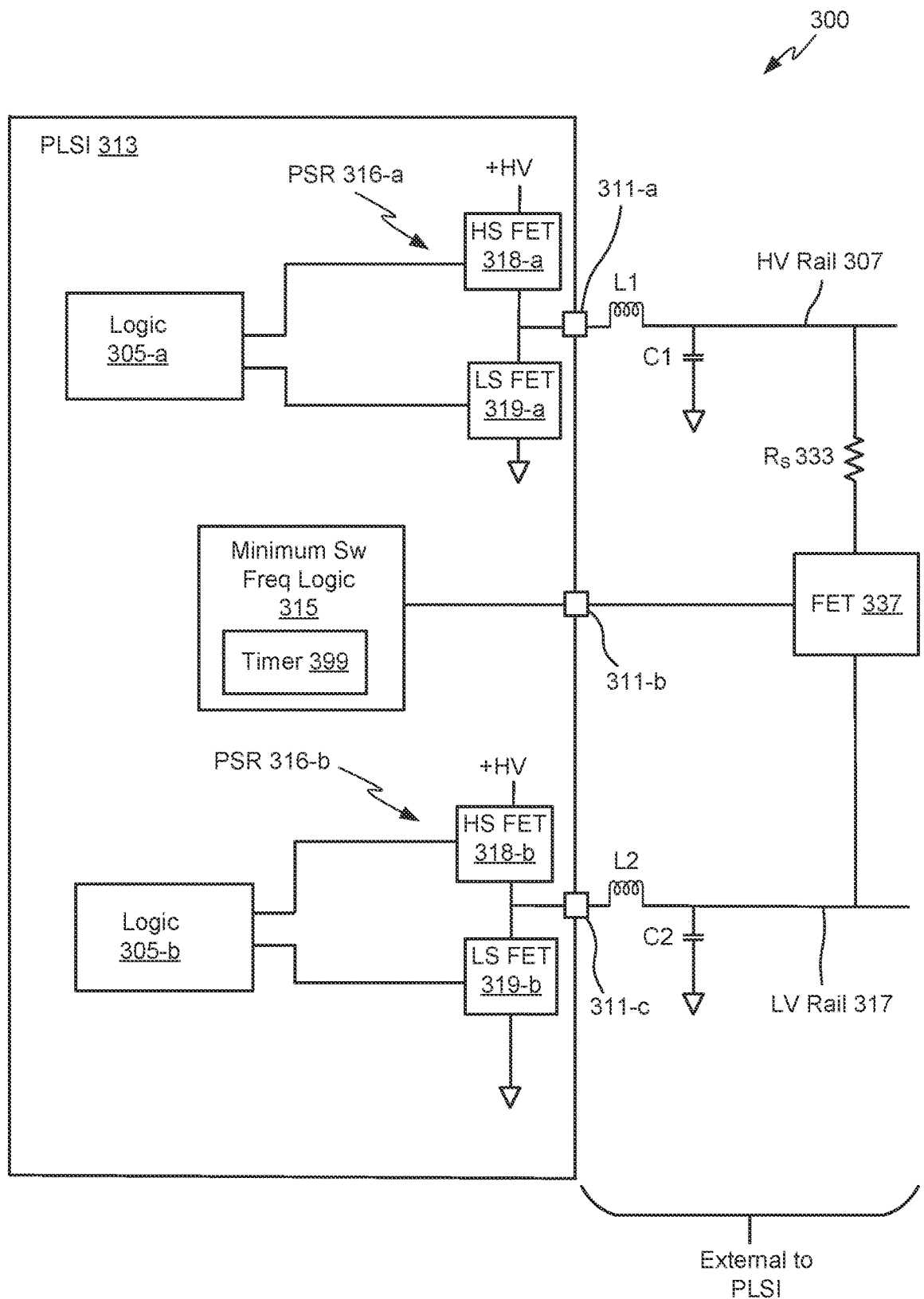
FIG. 3 shows a block diagram of some components of disk drive, including a power large scale integrated circuit (PLSI), a plurality of regulators, and a minimum switching frequency control circuit for controlling a pin and a switch to effectuate one or more aspects of the present disclosure.

In some cases, aspects of the present disclosure can be implemented using hardware (HW) modifications (e.g., providing a pin and an external switch or FET, as discussed in relation to FIG. 3) or using firmware (FW). In yet other cases, aspects of the present disclosure may be implemented through a combination of FW and HW modifications.

Figure 2A:
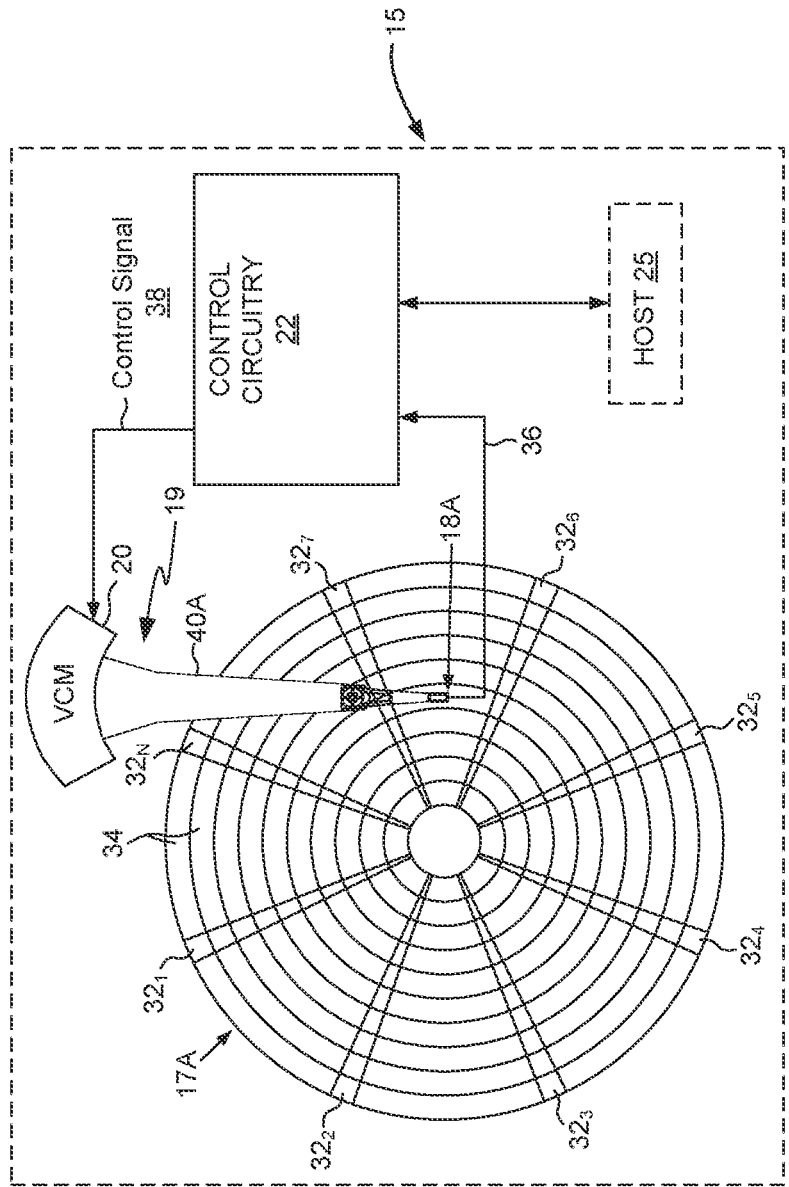
FIG. 2A illustrates a conceptual block diagram of a top view of a data storage device in the form of a disk drive comprising a head actuated over a disk and a control circuitry configured to effectuate one or more aspects of the present disclosure.
Figure 2B:
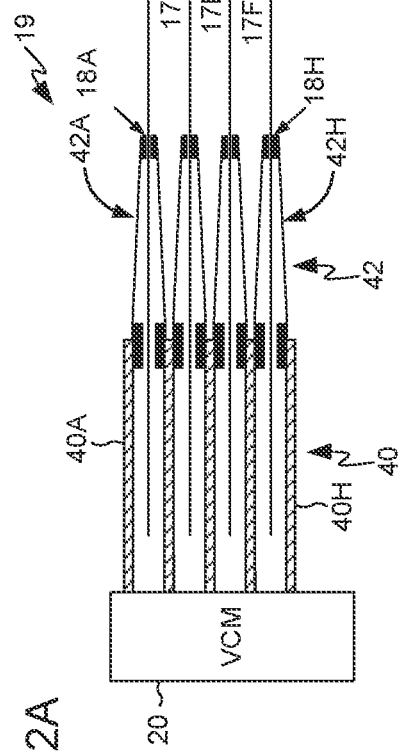
FIG. 2B illustrates a conceptual block diagram of a side view of the data storage device in FIG. 2A, according to various aspects of the present disclosure.

Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16").

Figure 2C:
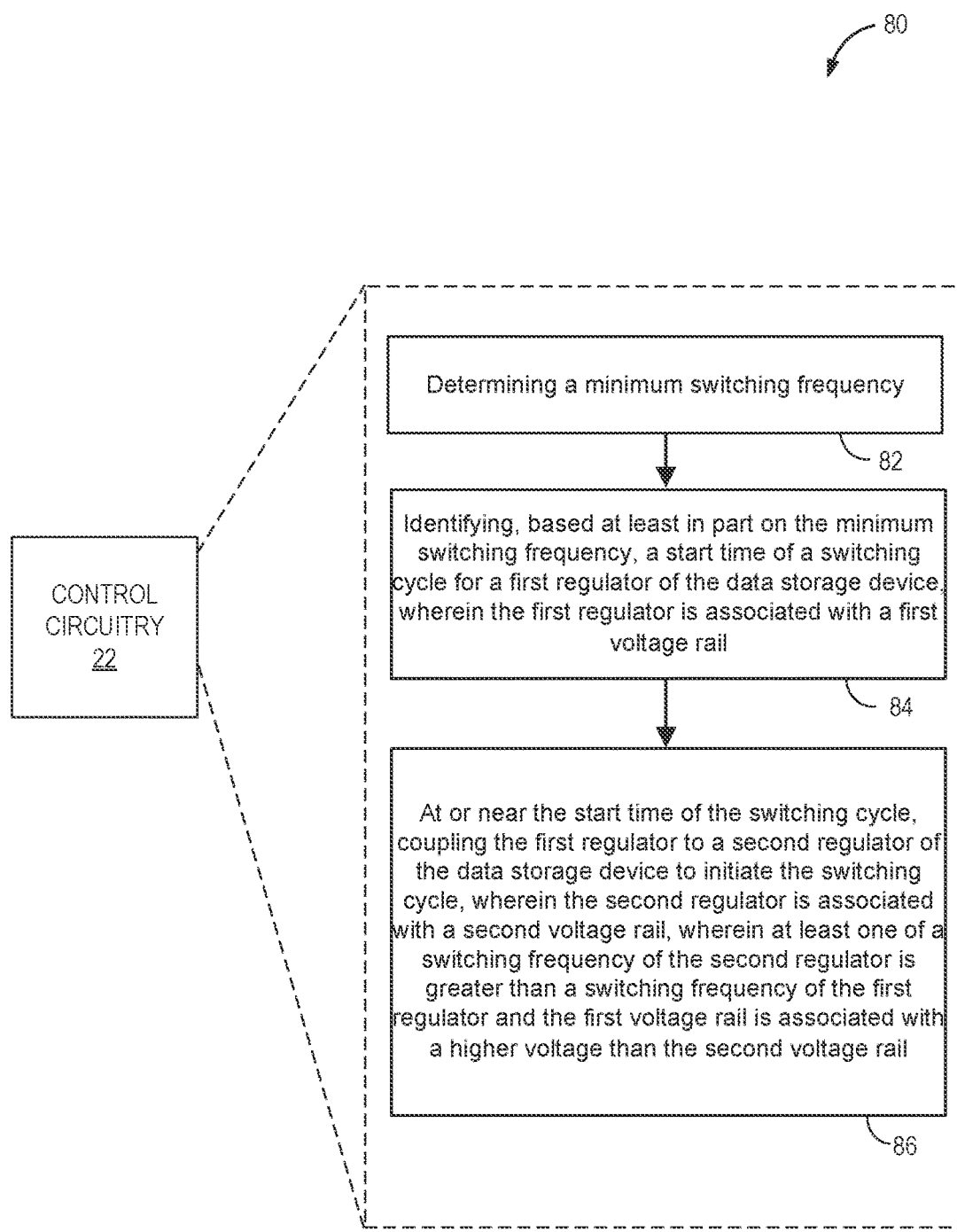
FIG. 2C illustrates an example of a method for optimizing power consumption for minimum switching frequency operation in a data storage device, according to various aspects of the disclosure.

FIG. 2C depicts a flowchart for an example method 80 that control circuitry 22 of disk drive 15 may perform or execute in controlling the operations of disk drive 15, including the operations of the plurality of regulators and the minimum switching frequency circuit, in accordance with aspects of the present disclosure, as further described below.

Each disk (shown as disks 16A-D) can have thin film magnetic material on each of the planar surfaces. Each recording surface may comprise a dedicated pair of read and write heads (also called disk heads) packaged in a slider that is mechanically positioned over the rotating disk by an actuator (e.g., shown as actuator assembly 19 in FIG. 2B). In some examples, the actuator(s) also provide the electrical connections to the components of the slider. The actuator assembly 19 may also comprise one or more preamps (e.g., read or write preamp) for the disk heads, write driver, read driver, and fly-height controls.

Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16. In some cases, the disk drive 15 according to various aspects of the disclosure comprises a System on a Chip (SoC), where the SoC comprises the electronics and firmware for the disk drive 15. The SoC may be used to control the functions of the disk drive 15 including providing power and/or control signals to the components of the disk drive. In some cases, the SoC may include the control circuitry 22. Alternatively, one or more aspects of the control circuitry 22 may be implemented in or using the SoC.

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., head 18A in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 321 through 32N) written onto disk surfaces 17. In some examples, the servo sectors 32 (or servo wedges 32) on a disk drive may be curved, but for sake of illustration, the servo sectors 32 in FIG. 2A have been shown with straight lines. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing process.

In some examples, the control circuitry 22 is configured to control the actuation of the primary actuator (i.e., VCM 20). Further, the VCM 20 is configured to actuate the head 18 over the disk surfaces 17.

The control circuitry 22 is further configured to control the spindle motor via one or more spindle drivers. In some embodiments, the spindle motor is configured to rotate the disk 16. For example, the disk(s) 16, such as disks 16A through 16D in FIG. 2B, are typically rotated by the spindle motor at a high speed so that an air bearing forms between the head 18 and the disk surface 17. In some cases, a commutation controller (e.g., of the control circuitry 22) applies a drive signal to the windings of the spindle motor using a particular commutation sequence in order to generate a rotating magnetic field that causes the spindle motor to rotate. In some cases, the commutation of the windings can be controlled by measuring a zero-crossing frequency of a back electromotive force (BEMF) voltage generated by the windings of the spindle motor, although other techniques are also contemplated in different embodiments. For instance, in some cases, a BEMF voltage generated by the windings of the spindle motor may be processed in order to drive the commutation sequence of the commutation controller. In another example, the commutation sequence may be driven based on data recorded on the disk(s) 16, such as servo sectors 321 through 32N that define the servo tracks.

Turning now to FIG. 2C, which illustrates an example of a method 80, in accordance with various aspects of the present disclosure. In some cases, one or more aspects of method 80 may be implemented using the control circuitry 22 of the disk drive. As seen, the control circuitry 22 is configured to determine a minimum switching frequency (82); identify, based at least in part on the minimum switching frequency, a start time of a switching cycle for a first regulator of the data storage device, wherein the first regulator is associated with a first voltage rail (84); and at or near the start time of the switching cycle, couple the first regulator to a second regulator of the data storage device to initiate the switching cycle (86). In some cases, the second regulator is associated with a second voltage rail. Furthermore, in some cases, at least one of (1) a switching frequency of the second regulator is greater than a switching frequency of the first regulator, and (2) the first voltage rail is associated with a higher voltage than the second voltage rail.

In the embodiment of FIG. 2A, the control circuitry 22 may also process a read signal 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 (e.g., a VCM control signal) applied to the VCM 20 which rotates an actuator arm 40 about a pivot in order to actuate the head 18 radially over the disk surface 17 in a direction that reduces the PES. It should be noted that other control signals besides control signal 38 are contemplated in different embodiments, and the VCM control signal is merely one non-limiting example of such a control signal. In one embodiment, the disk drive may also comprise a suitable microactuator, such as a suitable piezoelectric (PZT) element for actuating the head 18 relative to a suspension, or for actuating a suspension relative to the actuator arm 40.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks. In order to write the spiral servo tracks to the disk surface 17, at least one bootstrap spiral track is first written to the disk without using position feedback from servo data (i.e., the actuator or VCM 20 is controlled open loop with respect to servo data on the disk). Before writing the bootstrap spiral track, feedforward compensation is generated by evaluating the BEMF voltage generated by the VCM 20 during a calibration seek (where the BEMF voltage represents an estimated velocity of the VCM). The bootstrap spiral track is then written to the disk using the feed-forward compensation. In some embodiments, the BEMF voltage representing the velocity of the VCM 20 may be sampled at any suitable sample rate in order to update the feed-forward compensation at any suitable frequency during seek operations. It should be noted that the spindle motor may also generate a BEMF signal/voltage, which may be sampled to estimate one or more of the position and velocity/speed of the spindle motor.

FIG. 3 shows a block diagram 300 of a PLSI 313 and circuitry of the disk drive that resides external to the PLSI, according to various aspects of this disclosure. It should be noted that other variations/configurations of the PLSI and circuitry external to the PLSI are contemplated in different embodiments, and the examples shown in FIGS. 3-6 are not intended to limit the scope of the disclosure. For example, one or more components/elements shown external to the PLSI may instead be implemented within the PLSI and vice-versa. In one non-limiting example, one or more of the inductor ($L_1$) and capacitor ($C_1$) may be included in the PLSI 313. Additionally, or alternatively, inductor ($L_2$) and/or capacitor ($C_2$) may be included in the PLSI 313.

In some embodiments, the control circuitry 22 may include the PLSI 313, the minimum switching frequency circuit 315, the timer 399, and the SoC (not shown). As noted above, one or more aspects of the SoC can be implemented using the control circuitry 22. Alternatively, the control circuitry 22 may be used to implement one or more aspects of the SoC, in some embodiments.

In this example, the PLSI 313 comprises logic circuitry 305-*a* associated with a first PSR 316-*a* and a second PSR 316-*b*, where the first PSR is a higher voltage PSR than the second PSR. In one non-limiting example, the first PSR is a +2.5V PSR and the second PSR is a +1V PSR. It should be noted, however, that PSRs associated with different voltages besides the ones listed herein are contemplated in different embodiments, and the example voltage values (e.g., 2.5V, 1V, etc.) are not intended to limit the scope of the present disclosure. In some examples, the first PSR associated with the higher voltage may be coupled to a lighter load (e.g., a load configured to draw a smaller current) than the second PSR associated with the lower voltage. Additionally, or alternatively, the first PSR may operate at a slower switching frequency than the second PSR. In some cases, the first PSR (e.g., +2.5V PSR) is electrically connected to the minimum switching frequency control circuit 315 (or minimum switching frequency logic circuitry 315), where the minimum switching frequency circuit 315 includes a timer 399. In one non-limiting example, the timer 399 may be configured to generate a pulse at the desired minimum switching frequency, which may be greater than the 1st and/or 2nd order resonant frequency of the RV sensor. As an example, the 2nd order resonant frequency of the RV sensor may be around 168 KHz and the desired minimum switching frequency may be around 200 kHz (or any other frequency higher than the 2nd order resonance of the RV sensor, for instance). The frequency values listed herein are exemplary only and not intended to limit the scope and/or spirit of the disclosure.

FIG. 3 also depicts a plurality of pins 311-*a*, 311-*b*, and 311-*c*. In some cases, one or more of the pins (e.g., pin 311-*a*, pin 311-*b*) may be optional. As seen, the first pin 311-*a* is positioned at the junction between the high side field effect transistor (HS FET 318-*a*) and low side FET (LS FET 319-*a*) of the first PSR, i.e., at the output of the first PSR. Here, a resonant circuit comprising an inductor ($L_1$) and capacitor ($C_1$) is coupled between the pin 311-*a* and the high voltage (HV) rail 307. In this example, the inductor ($L_1$) and capacitor ($C_1$) represent the first PSR's components that are external to the PLSI 313. Similarly, the third pin 311-*c* is positioned at the junction between the HS FET 318-*b* and LS FET 319-*b* of the second PSR, i.e., at the output of the second PSR. Additionally, a resonant circuit comprising an inductor ($L_2$) and capacitor ($C_2$) is coupled between the pin 311-*c* and the low voltage (LV) rail 317. Here, the inductor ($L_2$) and capacitor ($C_2$) represent the second PSR's components that are external to the PLSI 313. In some embodiments, an external switch, such as FET 337, is coupled between the HV rail 307 and the LV rail 317. The minimum switching frequency circuit 315 may be configured to control (i.e., turn ON or OFF) the FET 337 via the pin 311-*b*. It should be noted that the term "external" as used here refers to the location of the FET 337 relative to the PLSI 313. In this case, the FET 337 is external to the PLSI 313, but within the disk drive. In some examples, the FET 337 may be a Metal-Oxide Semiconductor FET (MOSFET), although other types of FETs or switches known in the art are also contemplated in different embodiments.

In some embodiments, if a new switching cycle has not yet begun, the timer-generated pulse (i.e., pulse generated by the timer 399 of the circuit 315) may close the switch or FET 337, which causes the outputs of the first and second PSRs to be shorted together. In some aspects, the addition of the timer circuit 399 for setting a fixed shorting-time between the HV rail 307 and the LV rail 317 can facilitate in reducing the size and/or width of the overshoot produced on the LV rail or output as a result of the shorting. Additionally, or alternatively, appropriate selection of the value of the series resistance ($R_s$ 333) coupled to the external FET 337 can also help minimize or reduce the overshoot (e.g., generated on the lower voltage rail/output).

In some embodiments, the concepts described above can be extended to other regulators of a disk drive, such as, but not limited to, a positive boost switching regulator (pBSR), a negative boost switching regulator (nBSR), a negative switching regulator (NSR), and/or a positive linear regulator (PLR). Furthermore, aspects of the present disclosure can be implemented for any combination of higher voltage and lower voltage regulators (e.g., +2.5V to +1V, +1.8V to +1V, +17V to +1V, −17V to −3V, to name a few non-limiting examples).

Figure 4:
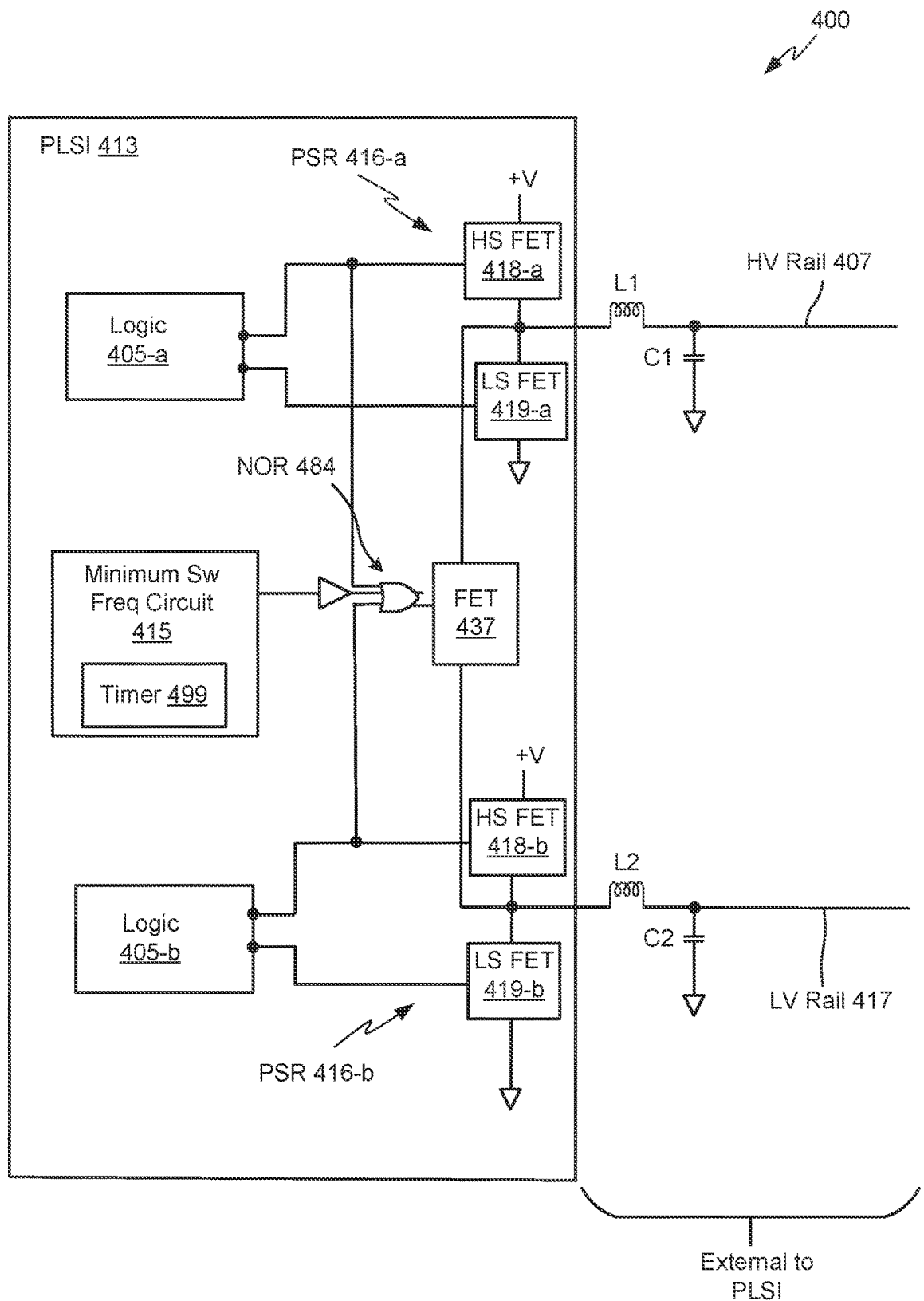
FIG. 4 shows a block diagram of some components of disk drive, including a PLSI, a plurality of regulators, and a minimum switching frequency control circuit for controlling a logic gate and a switch to effectuate one or more aspects of the present disclosure.

FIG. 4 depicts another block diagram 400 of a PLSI 413 of a disk drive and circuitry of the disk drive that resides external to the PLSI, according to various aspects of this disclosure. It should be noted that other variations/configurations of the PLSI and circuitry external to the PLSI are contemplated in different embodiments, and the examples shown in FIGS. 3-6 are not intended to limit the scope of the disclosure. For example, one or more components/elements shown external to the PLSI may instead be implemented within the PLSI and vice-versa. In one non-limiting example, one or more of the inductor ($L_1$) and capacitor ($C_1$) may be included in the PLSI 413. Additionally, or alternatively, inductor ($L_2$) and/or capacitor ($C_2$) may be included in the PLSI 413.

In this example, the PLSI 413 comprises logic circuitry 405-*a* associated with a first PSR 416-*a* and a second PSR 416-*b*, where the first PSR 416-*a* is configured for a higher voltage than the second PSR 416-*b*. In some cases, the first PSR 416-*a* and/or the second PSR 416-*b* may implement one or more aspects of the first PSR 316-*a* and/or second PSR 316-*b* described above in relation to FIG. 3. In one non-limiting example, the first PSR 416-*a* may be an example of a +2.5V PSR and the second PSR may be an example of a +1V PSR of a disk drive. It should be noted, however, that PSRs associated with different voltages besides the ones listed herein are contemplated in different embodiments, and the example voltage values (e.g., 2.5V, 1V, etc.) are not intended to limit the scope of the present disclosure.

In some examples, the first PSR 416-*a* may be coupled to a lighter load (e.g., a load configured to draw a smaller current) than the second PSR 416-*b*. Additionally, or alternatively, the first PSR 416-*a* may operate at a slower switching frequency than the second PSR 416-*b*. In some cases, the first PSR 416-*a* (e.g., +2.5V PSR) is electrically connected to the minimum switching frequency logic circuit 415 (or minimum switching frequency control circuit 415), where the minimum switching frequency circuit 415 includes a timer 499. In some embodiments, the timer 499 may be configured to generate a pulse at the desired minimum switching frequency, which may be greater than the 1st and/or 2nd order resonant frequency of the RV sensor (not shown). In one non-limiting example, the 2nd order resonant frequency of the RV sensor may be around 168 kHz and the desired minimum switching frequency may be around 200 kHz (or alternatively, any frequency greater than and sufficiently apart from the 2nd order resonance, for instance). As noted above, the frequency values listed herein are exemplary only and not intended to limit the scope and/or spirit of the disclosure.

As seen in FIG. 4, the PSR 416-a comprises a HS FET 418-a and a LS FET 419-a, while the PSR 416-b comprises a HS FET 418-b and a LS FET 419-b. In some embodiments, aspects of the present disclosure can be implemented without the use of a dedicated pin and external FET (i.e., FIG. 3). Instead, the switch nodes of the first and second regulators (e.g., PSRs 416-a, 416-b) can be internally shorted within the PLSI 413 itself. In some cases, the switch nodes of the first and second PSRs 416-a and 416-b may be shorted when the high side FETs of both the regulators are turned OFF. To ensure that the switch nodes are only shorted together when both regulator's high side FETs are turned OFF, the output of the minimum switching frequency circuit 415 can be NOR'ed with the two high side FET's controller of the lower voltage regulator. For example, when both the HS FET 418-a and HS 418-b are OFF, the controller 22 (or alternatively, the minimum switching frequency circuit 415) in conjunction with the NOR logic gate 484 can close the switch (e.g., FET 437) to short the switch nodes of the two regulators 416-a and 416-b.

As seen, the NOR gate 484 has three inputs, each of which can be set to '1' or '0'. In some embodiments, all three inputs of the NOR gate 484 may need to be set to '0' for the output of the NOR gate to be high (i.e., enable minimum switching frequency). As an example, a first input of the NOR gate 484 may be coupled to the HS FET 418-a of the higher voltage regulator (or PSR 416-a), a second input of the NOR gate 484 may be coupled to the HS FET 418-b of the lower voltage regulator (or PSR 416-b), and a third input of the NOR gate 484 may be coupled to the minimum switching frequency circuit 415 via an inverter. In some cases, the third input of the NOR gate 484 may be inverted with respect to the output of the minimum switching frequency circuit 415. For example, the minimum switching frequency logic may output a high signal (or '1') when the operating frequency is lower than the minimum switching frequency. In such cases, the inverter provides a value of '0' to the third input of the NOR gate 484. Furthermore, if both the HS FETs 418-a and 418-b are also OFF (i.e., first and second inputs of the NOR gate 484 are set to '0'), the output of the NOR logic 484 produces a signal that causes the FET 437 to short the high voltage regulator's switch node to the lower voltage regulator's switch node, in accordance with various aspects of the disclosure.

In some aspects, connecting the switch nodes via a shorting FET (i.e., FET 437) and before the inductors $L_1$ and $L_2$ enables the shorting to be implemented inside the PLSI 413. Such a design minimizes the need for an external PIN and/or any other external components (e.g., wires, cables) for shorting the outputs of the regulators.

Figure 5:
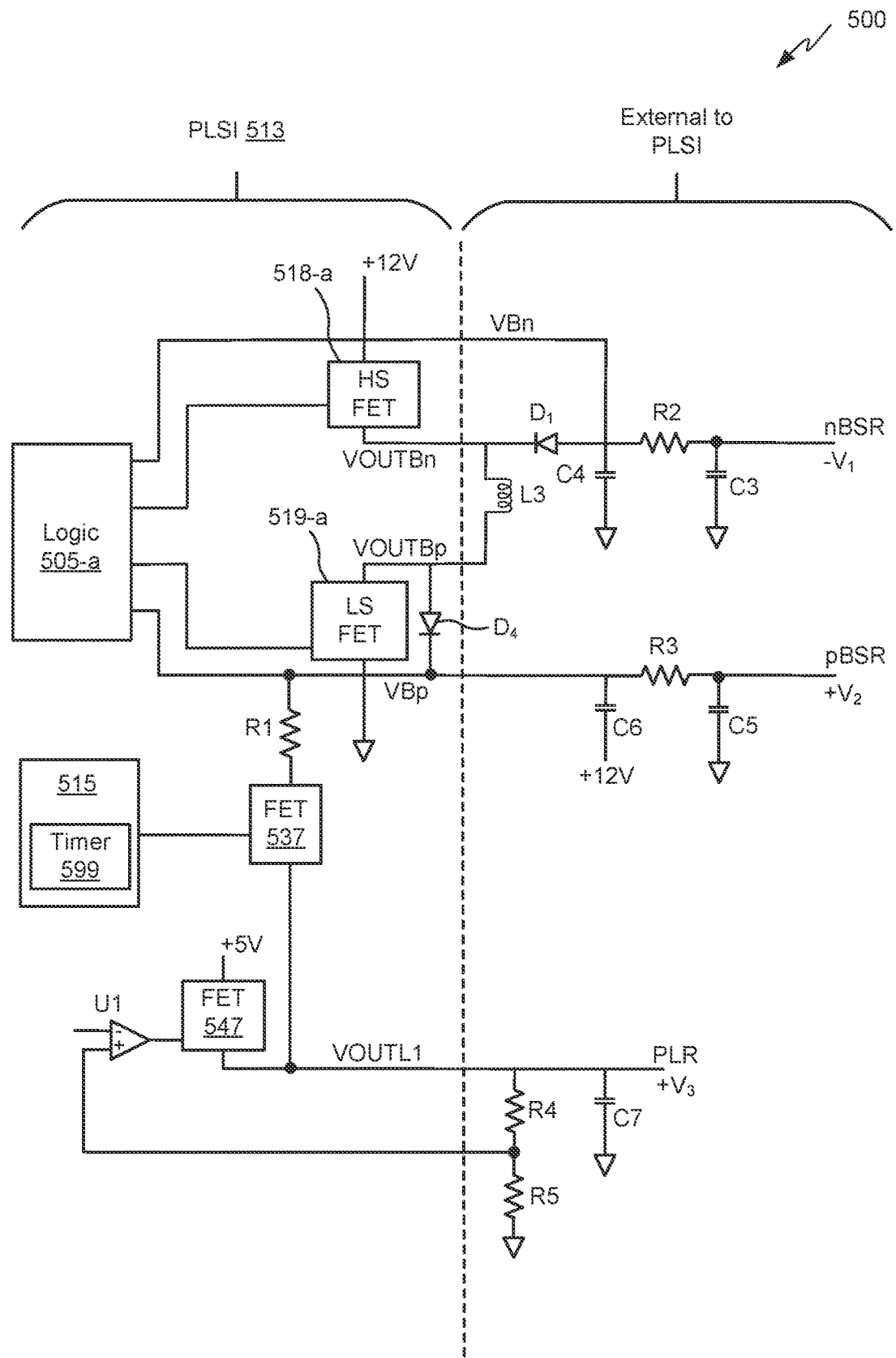
FIG. 5 shows a block diagram of some components of disk drive, including a PLSI, a plurality of regulators, and a minimum switching frequency control circuit for shorting the outputs of the plurality of regulators, according to various aspects of the present disclosure.

Turning now to FIG. 5, which depicts another block diagram 500 of a PLSI 513 and circuitry external to the PLSI, according to various aspects of this disclosure. It should be noted that other variations/configurations of the PLSI and circuitry external to the PLSI are contemplated in different embodiments, and the examples shown in FIGS. 3-6 are not intended to limit the scope of the disclosure. For example, one or more components/elements shown external to the PLSI may instead be implemented within the PLSI and vice-versa. In one non-limiting example, one or more of the inductor ($L_3$), diode ($D_1$), and capacitor (Ca) may be included in the PLSI 513. Additionally, or alternatively, resistor ($R_3$) and capacitors ($C_6$) and ($C_5$) may be included in the PLSI 513.

In some cases, the disk drive may include other types of regulators besides positive switching regulators (PSRs), for instance, a positive boost switching regulator (pBSR) and a negative boost switching regulator (nBSR). As seen in FIG. 5, the PLSI 513 comprises logic circuitry 505-a that is coupled to the HS FET 518-a of the nBSR and the LS FET 519-a of the pBSR. The PLSI further includes a comparator (U1) and a FET 547 associated with a positive linear regulator (PLR).

In this example, the nBSR has a voltage rating of $-V_1$ volts (e.g., $-18V$), and the pBSR has a voltage rating of $+V_2$ volts (e.g., 17V). It should be noted, however, that nBSRs and/or pBSRs associated with different voltages besides the ones listed herein are contemplated in different embodiments, and the example voltage values (e.g., $-18V$, $+17V$, etc.) are not intended to limit the scope of the present disclosure. In some examples, the disk drive may include a pin for the output voltage of the pBSR, where the voltage at the pin/node is VBp. In some embodiments, for pBSR and nBSR supplies, this pin may be shorted to one of the internal pins of the PLR. Specifically, but without limitation, the pin at the output voltage of the pBSR can be shorted to the pin/node (i.e., corresponding to the VOUTL1 voltage in FIG. 5) via the FET 537 and the series resistance $R_1$. In some cases, the switch or FET 537 can be controlled (i.e., turned ON or OFF) based on a control signal received from the minimum switching frequency logic circuit 515. In some cases, the PLSI 513 may have direct access to the pBSR, and the PLR may be configured to supply a DC/filtered voltage. In such cases, when the higher voltage regulator comprises a pBSR and the lower voltage regulator comprises a PLR, the outputs (i.e., corresponding to the VBp and VOUTL1 nodes) of the regulators can be shorted internally, which can serve to simplify the design.

The minimum switching frequency logic circuit 515 may be similar or substantially similar to the minimum switching frequency logic circuit(s) 315 and/or 415 described above in relation to FIGS. 3 and/or 4, respectively. In some embodiments, the circuit 515 may include a timer 599, which allows setting a fixed or consistent shorting-time between the rails (e.g., pBSR and PLR). As noted above, the timer circuit 599 may be configured to generate a pulse at a desired minimum switching frequency (e.g., >200 kHz) that is higher than the frequencies associated with the $1^{st}$ or $2^{nd}$ order resonances of the RV sensor. Such a design can help control (i.e., minimize or reduce) the overshoot generated on the lower voltage output or rail. In some cases, the voltage rating ($V_3$) of the PLR may be less than the voltage rating ($V_2$) of the pBSR. For instance, the PLR may be an example of a +1.8V PLR, while the pBSR may be an example of a +17V pBSR.

In some cases, similar principles may apply for shorting two negative voltage regulators, for instance, an nBSR (e.g., $-18V$ nBSR) and an NSR (e.g., a $-3V$ NSR). Such a design can help initialize the start of a new switching cycle and thereby optimize power consumption and/or reduce regulator to RV noise coupling, further described below in relation to FIG. 6.

Figure 6:
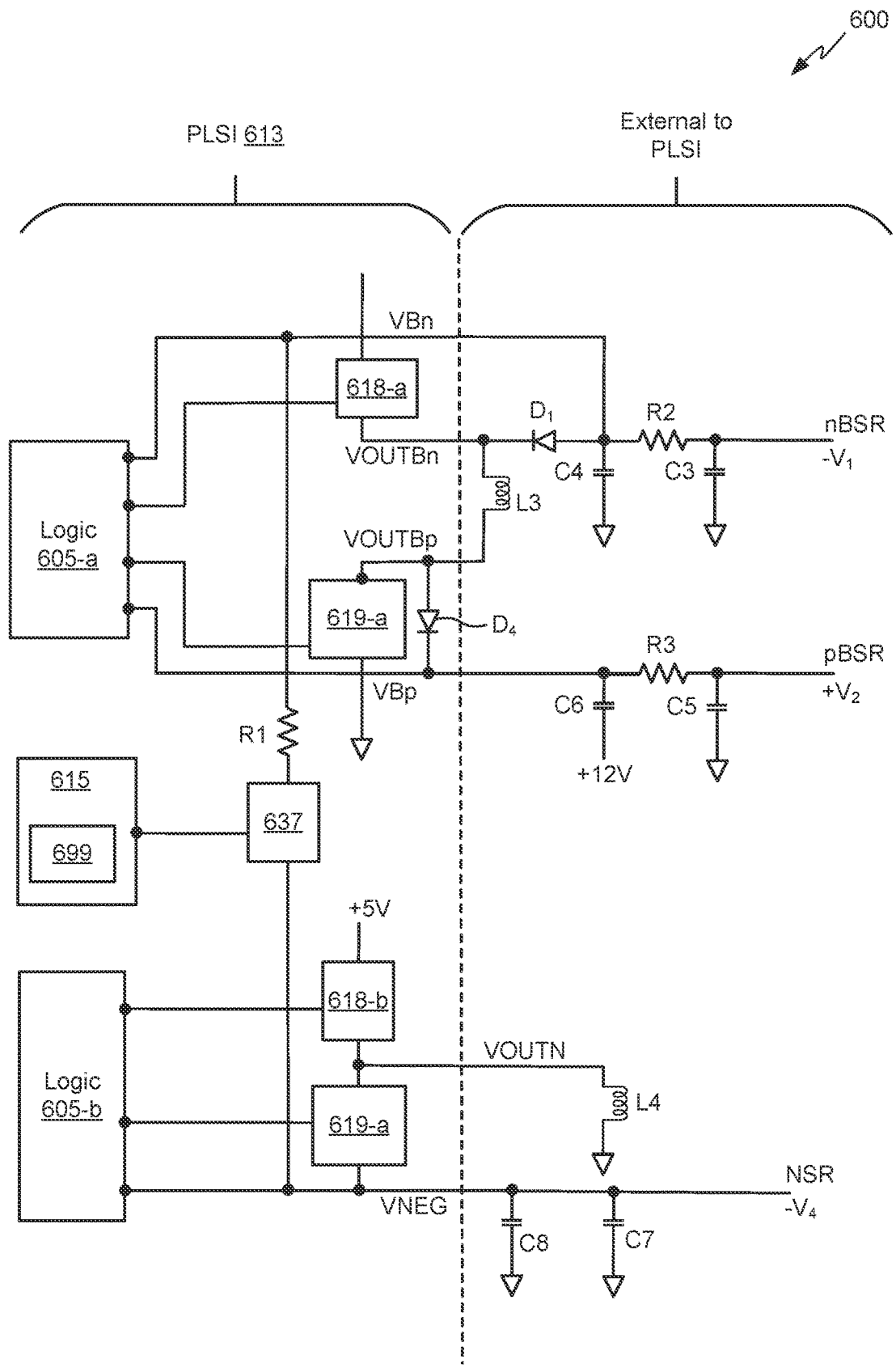
FIG. 6 shows a block diagram of some components of disk drive, including a PLSI, a plurality of regulators, and a minimum switching frequency control circuit for shorting the outputs of the plurality of regulators, according to various aspects of the present disclosure.

FIG. 6 depicts a block diagram 600 of a PLSI 613 and circuitry external to the PLSI, according to various aspects of this disclosure. The block diagram 600 shown in FIG. 6 implements one or more aspects of the block diagram described in relation to FIG. 5. It should be noted that other variations/configurations of the PLSI and circuitry external to the PLSI are contemplated in different embodiments, and the examples shown in FIGS. 3-6 are not intended to limit the scope of the disclosure. For example, one or more components/elements shown external to the PLSI may instead be implemented within the PLSI and vice-versa. In one non-limiting example, one or more of the inductor ($L_3$), diode ($D_1$), and capacitor ($C_4$) may be included in the PLSI 613. Additionally, or alternatively, resistor ($R_3$) and capacitors ($C_6$) and ($C_5$) may be included in the PLSI 613. In yet other cases, one or more of resistor ($R_2$) and capacitor ($C_3$) are also included in the PLSI 613.

As shown in FIG. 6, the PLSI 613 comprises logic circuitry 605-$a$ that is electrically coupled to a HS FET 618-$a$ of the nBSR (e.g., having a voltage rating of $-V_1$ volts) and a LS FET 619-$a$ of the pBSR (e.g., having a voltage rating of $+V_2$ volts). The PLSI further includes logic circuitry 605-$b$ associated with a negative switching regulator (NSR), where the magnitude of the voltage rating of the NSR may be lower than the magnitude of the voltage rating of the nBSR. In one non-limiting example, the nBSR may have a voltage rating of $-18V$, while the NSR may have a voltage rating of $-3V$.

In some cases, to conserve power, the output of a higher voltage regulator (e.g., nBSR in FIG. 6) can be temporarily shorted to a lower voltage rail (e.g., voltage rail associated with NSR in FIG. 6), which enables the higher voltage to be drained to force a new switching cycle. In some aspects, draining the higher magnitude voltage (e.g., $-V_1$ volts, or alternatively, VBn) to the lower voltage rail (e.g., $-V_4$, or alternatively, VNEG) to force a new switching cycle enables the switching frequency of the slow switching higher voltage regulator (i.e., nBSR) to be maintained above the desired minimum switching frequency. In some cases, the desired minimum switching frequency may be selected based on the $1^{st}$ or $2^{nd}$ order resonances of the RV sensors.

As seen in FIG. 6, VBn associated with the regulator (nBSR) can be shorted to the pin (VNEG) of the regulator (NSR) via the series resistance ($R_1$) and the FET 637. Specifically, the minimum switching frequency control circuit 615 comprising the timer 699 can be used to control the opening/closing of the switch or FET 637, which allows VBn to be temporarily shorted to VNEG to force the new switching cycle. In some examples, the timer circuit 699 is configured to generate a pulse at a frequency that is at or above a threshold (e.g., minimum switching frequency, which may be around 200 kHz), where the generated pulse is used to control the FET 637.

Thus, besides power savings, the minimum switching frequency feature(s) discussed in the present disclosure can also help reduce the regulator to RV sensor coupling, as compared to the prior art. Additionally, aspects of the present disclosure can be implemented for different types of voltage regulators (e.g., nBSR, pBSR, PSR, NSR, and/or PLR) having different operating ranges and/or coupled to different components (e.g., piezo actuator drivers, SoC, NAND flash memory, etc.) of a disk drive.

As noted above, other variations/configurations of the PLSI (e.g., PLSI 313, PLSI 413, PLSI 513, and/or PLSI 613) and circuitry external to the PLSI are contemplated in different embodiments, and the examples shown in FIGS. 3-6 are not intended to limit the scope and/or spirit of the present disclosure. For example, one or more components/elements shown external to a PLSI may instead be implemented within the PLSI and vice-versa.

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SOC), such as SoC 350 in FIG. 3, SoC 450 in FIG. 4. In addition, the control circuitry 22 may include a preamp circuit, where the preamp circuit is implemented as a separate integrated circuit, integrated into the read channel or data storage controller circuit, or integrated into the SoC.

In some examples, the control circuitry, such as, but not limited to, control circuitry 22, comprises a microprocessor executing instructions, the instructions being operable to cause the microprocessor to perform the flow diagrams (e.g., shown in FIG. 2C) described herein. The instructions may be stored in any computer-readable medium. In some examples, they may be stored on a non-volatile semiconductor memory device, component, or system external to the microprocessor, or integrated with the microprocessor in the SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain method(s), event(s), or process blocks may be omitted in some implementations. The methods and processes described herein are also not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 may be performed by or embodied in hardware, and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods are thus shown and described herein, in various foundational aspects and in various selected illustrative applications, architectures, techniques, and methods for power improvement for minimum switching frequency operation for data storage devices, and other aspects of this disclosure. Persons skilled in the relevant fields of art will be well-equipped by this disclosure with an understanding and an informed reduction to practice of a wide panoply of further applications, architectures, techniques, and methods for power improvement for minimum switching frequency operation for data storage devices, and other aspects encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A disk drive comprising:
   a plurality of regulators;
   a first voltage rail associated with a first regulator of the plurality of regulators;
   a second voltage rail associated with a second regulator of the plurality of regulators, wherein a switching frequency of the second regulator is greater than a switching frequency of the first regulator, the first voltage rail is associated with a higher voltage than the second voltage rail, or a combination thereof; and
   one or more processing devices or components configured, individually or in combination, to:
   determine a minimum switching frequency;
   determine a start time of a switching cycle for the first regulator, based at least in part on the determined minimum switching frequency; and
   at or near the start time of the switching cycle, couple the first regulator to the second regulator to initiate the switching cycle.

2. The disk drive of claim 1, wherein the first regulator is coupled to a load that has a lower impedance than a load coupled to the second regulator.

3. The disk drive of claim 2, wherein the first regulator is configured to draw a lower current than a current drawn by the second regulator.

4. The disk drive of claim 2, wherein the one or more processing devices or components are further configured, individually or in combination, to:
   couple an output of the first regulator on the first voltage rail to an output of the second regulator on the second voltage rail to initiate the switching cycle.

5. The disk drive of claim 1, wherein each of the first regulator and the second regulator is one of a positive switching regulator (PSR), a positive boost switching regulator (pBSR), a negative boost switching regulator (nBSR), and a positive linear regulator (PLR).

6. The disk drive of claim 1, further comprising a timer circuit, and wherein the one or more processing devices or components are further configured, individually or in combination, to:

control the timer circuit to set a pre-determined shorting-time between the first voltage rail and the second voltage rail to control an overshoot generated on the second voltage rail when the first regulator is shorted or coupled to the second regulator.

7. The disk drive of claim 1, further comprising:
a power large scale integrated circuit (PLSI) comprising the first and second voltage rails; and
a pin for controlling a field effect transistor (FET) external to the PLSI to enable coupling an output of the first regulator from the first voltage rail to the second voltage rail to initiate the switching cycle, and wherein a switch is coupled between the first voltage rail and the second voltage rail.

8. The disk drive of claim 1, wherein the first regulator comprises a first switch node and the second regulator comprises a second switch node, and wherein the one or more processing devices or components are further configured, individually or in combination, to:
couple the first switch node and the second switch node when a respective high side field effect transistor (FET) of each of the first regulator and the second regulator is turned OFF to initiate the switching cycle.

9. The disk drive of claim 1, wherein the first regulator comprises a positive boost switching regulator (pBSR) and the second regulator comprises a positive linear regulator (PLR), and wherein the one or more processing devices or components are further configured, individually or in combination, to:
short an output pin of the pBSR with an output pin of the PLR to initiate the switching cycle.

10. The disk drive of claim 1, wherein the first regulator comprises a negative boost switching regulator (nBSR) and the second regulator comprises a negative switching regulator (NSR), and wherein the one or more processing devices or components are further configured, individually or in combination, to:
short an output pin of the nBSR with an output pin of the NSR to initiate the switching cycle.

11. The disk drive of claim 1, wherein determining the minimum switching frequency is based at least in part on determining one or more higher order resonances of a rotational vibrational (RV) sensor of the disk drive.

12. The disk drive of claim 1, further comprising a power large scale integrated circuit (PLSI) comprising the first and second voltage rails, and wherein:
(1) the switching frequency of the second regulator is greater than the switching frequency of the first regulator, and
(2) the first voltage rail is associated with a higher voltage than the second voltage rail.

13. A method for operating a data storage device, the method comprising:
determining a minimum switching frequency;
determining, based at least in part on determining the minimum switching frequency, a start time of a switching cycle for a first regulator of the data storage device, wherein the first regulator is associated with a first voltage rail; and
at or near the start time of the switching cycle, coupling the first regulator to a second regulator of the data storage device to initiate the switching cycle, wherein the second regulator is associated with a second voltage rail, and
wherein at least one of a switching frequency of the second regulator is greater than a switching frequency of the first regulator and the first voltage rail is associated with a higher voltage than the second voltage rail.

14. The method of claim 13, further comprising:
setting a pre-determined shorting-time between the first voltage rail and the second voltage rail to control an overshoot generated on the second voltage rail when the first regulator is shorted or coupled to the second regulator.

15. The method of claim 13, further comprising:
controlling, via a pin, a field effect transistor (FET) to enable coupling an output of the first regulator from the first voltage rail to the second voltage rail to initiate the switching cycle, and wherein the FET is external to a power large scale integrated circuit (PLSI) of the data storage device and is coupled between the first voltage rail and the second voltage rail.

16. The method of claim 13, wherein the first regulator comprises a first switch node and the second regulator comprises a second switch node, the method further comprising:
coupling the first switch node and the second switch node when a respective high side field effect transistor (FET) of each of the first regulator and the second regulator is turned OFF to initiate the switching cycle.

17. The method of claim 13, wherein the first regulator comprises a positive boost switching regulator (pBSR) and the second regulator comprises a positive linear regulator (PLR), the method further comprising:
shorting an output pin of the pBSR with an output pin of the PLR to initiate the switching cycle.

18. The method of claim 13, wherein the first regulator comprises a negative boost switching regulator (nBSR) and the second regulator comprises a negative switching regulator (NSR), the method further comprising:
shorting an output pin of the nBSR with an output pin of the NSR to initiate the switching cycle.

19. The method of claim 13, wherein at least one of:
initiating the switching cycle comprises coupling an output of the first regulator on the first voltage rail to an output of the second regulator on the second voltage rail;
each of the first regulator and the second regulator is one of a positive switching regulator (PSR), a positive boost switching regulator (pBSR), a negative boost switching regulator (nBSR), and a positive linear regulator (PLR); and
determining the minimum switching frequency is based at least in part on determining one or more higher order resonances of a rotational vibrational (RV) sensor of the data storage device.

20. One or more processing devices, comprising:
means for determining a minimum switching frequency; and
means for identifying, based at least in part on the determined minimum switching frequency, a start time of a switching cycle for a first regulator of a data storage device, wherein the first regulator is associated with a first voltage rail; and
means for coupling the first regulator to a second regulator of the data storage device to initiate the switching cycle at or near the start time, wherein the second regulator is associated with a second voltage rail, and wherein at least one of a switching frequency of the second regulator is greater than a switching frequency of the first regulator and the first voltage rail is associated with a higher voltage than the second voltage rail.

* * * * *